United States Patent
Jeon et al.

(10) Patent No.: US 11,807,544 B2
(45) Date of Patent: Nov. 7, 2023

(54) SELECTIVE RECOVERY METHOD OF VANADIUM AND CESIUM FROM WASTE SULFURIC ACID VANADIUM CATALYST, AND HIGH-QUALITY VANADIUM AQUEOUS SOLUTION AND CESIUM ALUM PRODUCED THEREBY

(71) Applicant: Korea Institute Of Geoscience And Mineral Resources, Daejeon (KR)

(72) Inventors: Ho Seok Jeon, Daejeon (KR); Shun Myung Shin, Daejeon (KR); Dong Ju Shin, Daejeon (KR); Dong Seok Lee, Daejeon (KR); Sung Ho Joo, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 17/940,351

(22) Filed: Sep. 8, 2022

(65) Prior Publication Data

US 2023/0138828 A1    May 4, 2023

(30) Foreign Application Priority Data

Oct. 28, 2021 (KR) .................. 10-2021-0145223

(51) Int. Cl.
*C01F 17/13* (2020.01)
*C01G 31/00* (2006.01)
(Continued)

(52) U.S. Cl.
CPC ............ *C01F 17/13* (2020.01); *C01F 17/282* (2020.01); *C01G 31/003* (2013.01); *C22B 3/42* (2013.01);
(Continued)

(58) Field of Classification Search
CPC ...... C01F 17/13; C01F 17/282; C01G 31/003; C22B 3/42; C22B 34/225; C22B 61/00
(Continued)

(56) References Cited

U.S. PATENT DOCUMENTS

| 5,431,892 A | 7/1995 | Toyabe et al. |
| 2008/0166281 A1 | 7/2008 | Harms et al. |

(Continued)

FOREIGN PATENT DOCUMENTS

| CN | 104805298 A | 7/2015 |
| CN | 107177737 A | 9/2017 |

(Continued)

OTHER PUBLICATIONS

Korean Office Action for Korean patent application No. 10-2021-0145223 dated Jan. 4, 2022; english translation attached.
Korean Notice of Allowance for Korean patent application No. 10-2021-0145223 dated Apr. 19, 2022; english translation attached.
(Continued)

*Primary Examiner* — Melissa S Swain
(74) *Attorney, Agent, or Firm* — Harness, Dickey & Pierce, P.L.C.

(57) ABSTRACT

Provided are a selective recovery method of vanadium and cesium from a waste sulfuric acid vanadium catalyst by a hydrometallurgical method including water leaching, solid-liquid separation, vanadium solvent extraction, vanadium selective stripping, and cesium alum production, and a high-quality vanadium aqueous solution and cesium alum produced thereby.

16 Claims, 5 Drawing Sheets

(51) Int. Cl.
- *C01F 17/282* (2020.01)
- *C22B 3/42* (2006.01)
- *C22B 34/22* (2006.01)
- *C22B 61/00* (2006.01)

(52) U.S. Cl.
CPC ............ *C22B 34/225* (2013.01); *C22B 61/00* (2013.01); *C01P 2006/80* (2013.01)

(58) Field of Classification Search
USPC ....................................................... 423/21.5
See application file for complete search history.

(56) References Cited

U.S. PATENT DOCUMENTS

| | | |
|---|---|---|
| 2019/0048437 A1 | 2/2019 | Mokmeli et al. |
| 2020/0157696 A1 | 5/2020 | Cardarelli |
| 2021/0230759 A1 | 7/2021 | Cardarelli |

FOREIGN PATENT DOCUMENTS

| | | |
|---|---|---|
| CN | 105986123 B | 1/2019 |
| CN | 111455186 A | 7/2020 |
| JP | 2008528422 A | 7/2008 |
| JP | 2011-168835 A | 9/2011 |
| JP | 2018520846 A | 8/2018 |
| KR | 101187301 B1 | 10/2012 |

OTHER PUBLICATIONS

Japanese Office Action dated Oct. 18, 2022 issued in corresponding Japanese Appln. No. 2022-159182.
CN OA dated Jan. 31, 2023 for corresponding CN Patent Application No. 202211250738.4.

[FIG. 1]
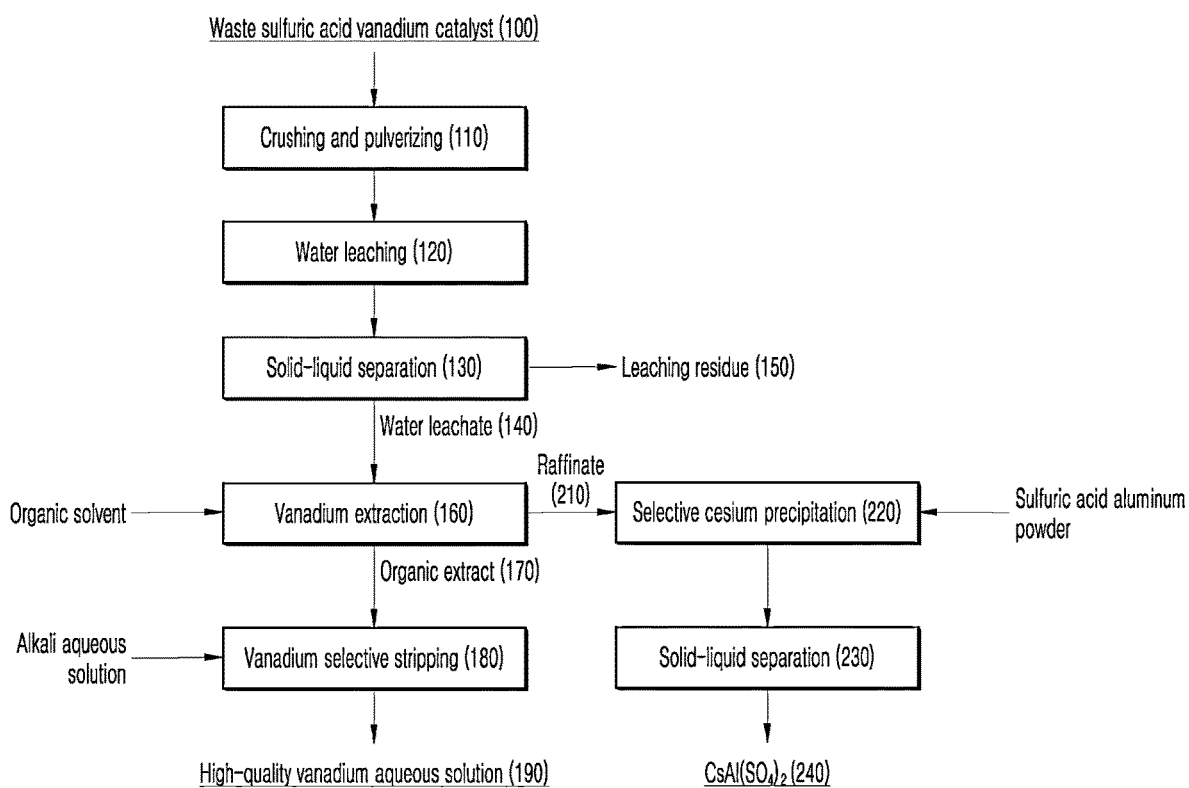

[FIG. 2]
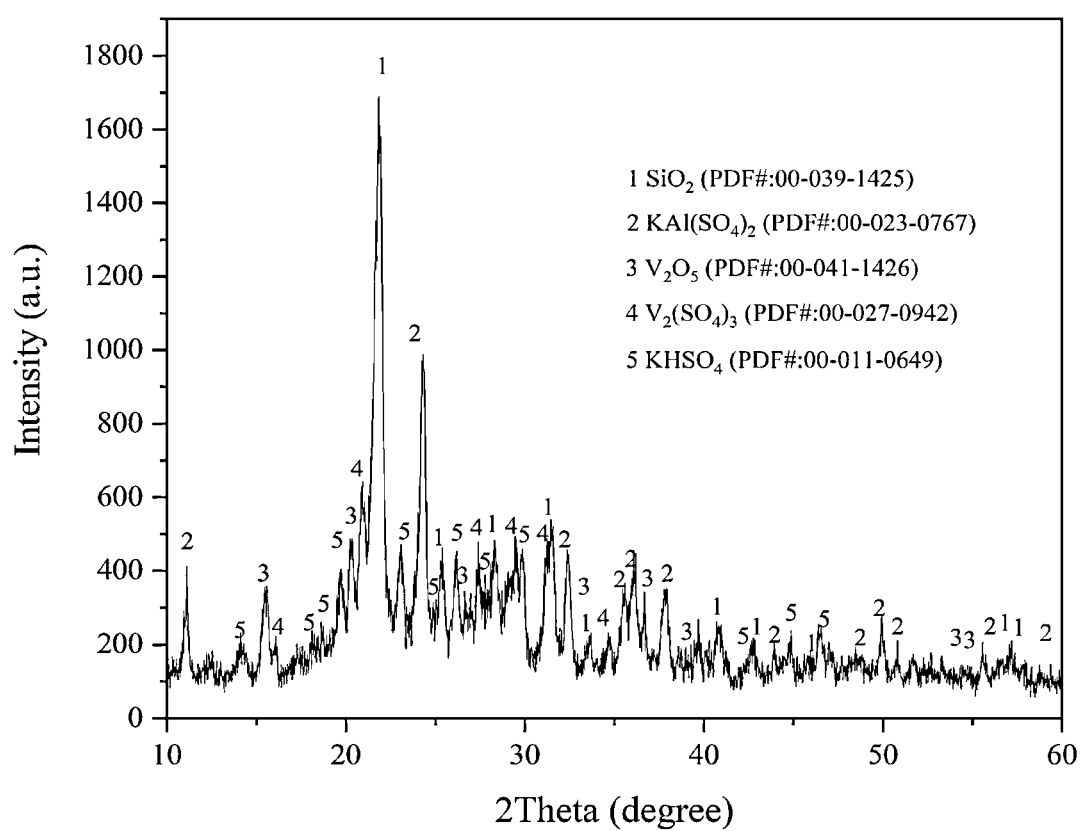

[FIG. 3A]
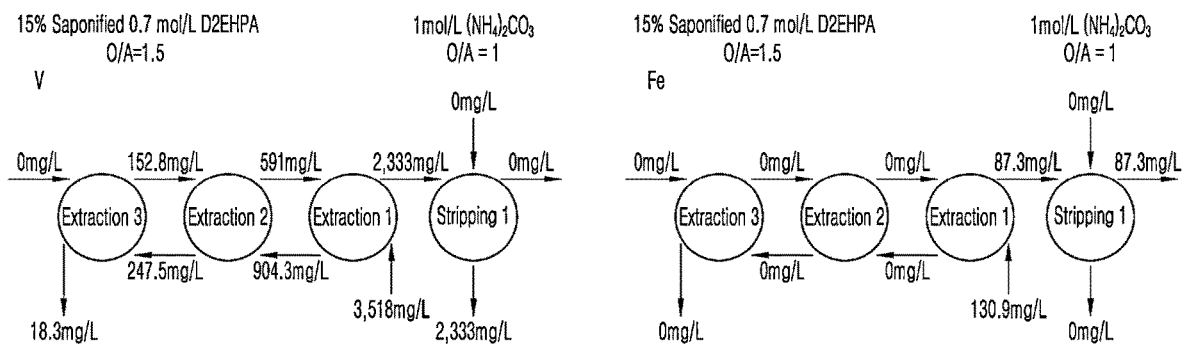
[FIG. 3B]
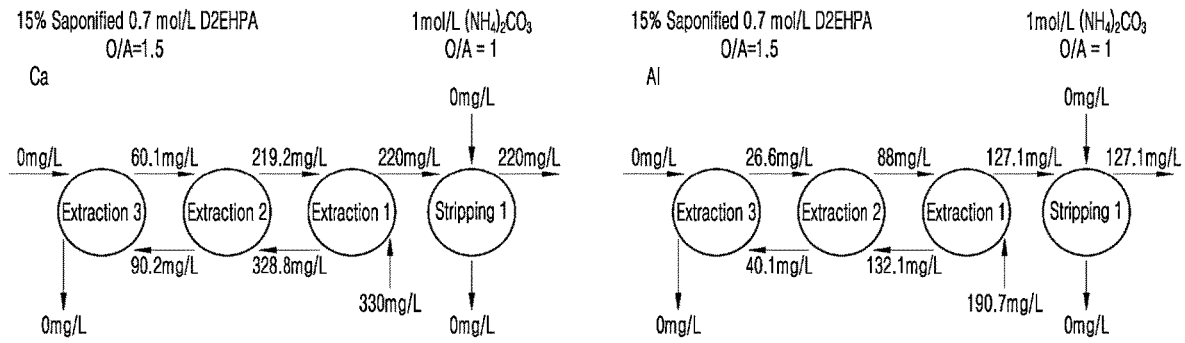
[FIG. 3C]
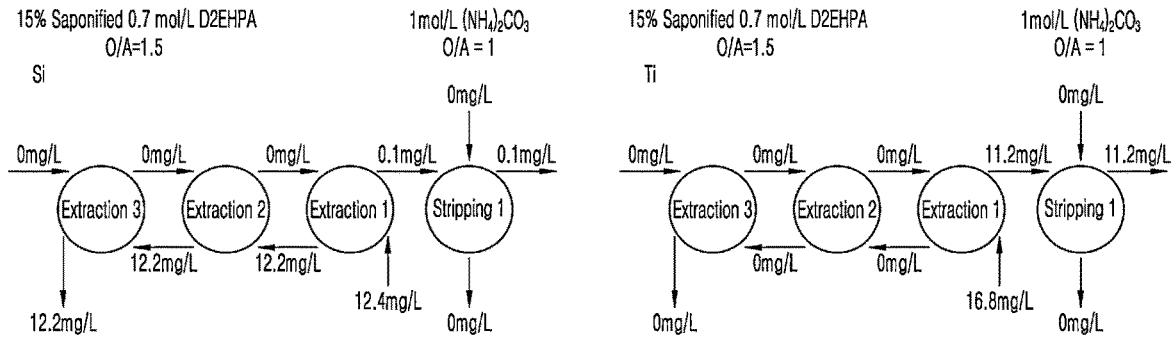

[FIG. 3D]
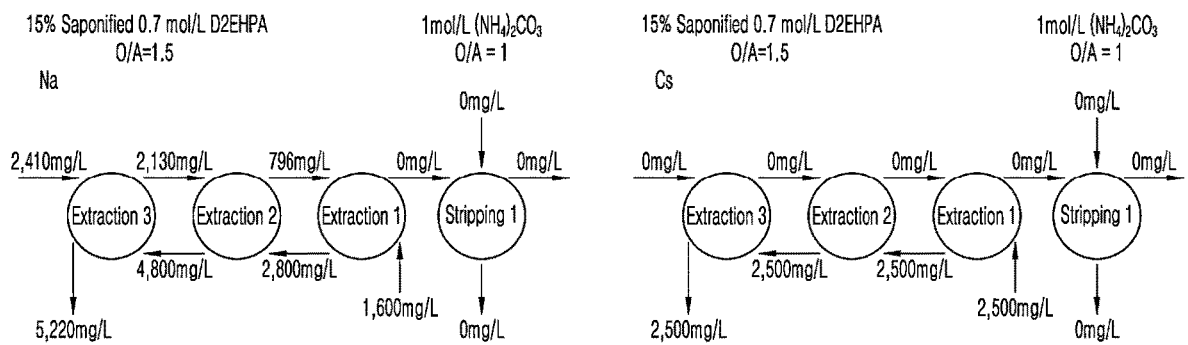
[FIG. 3E]
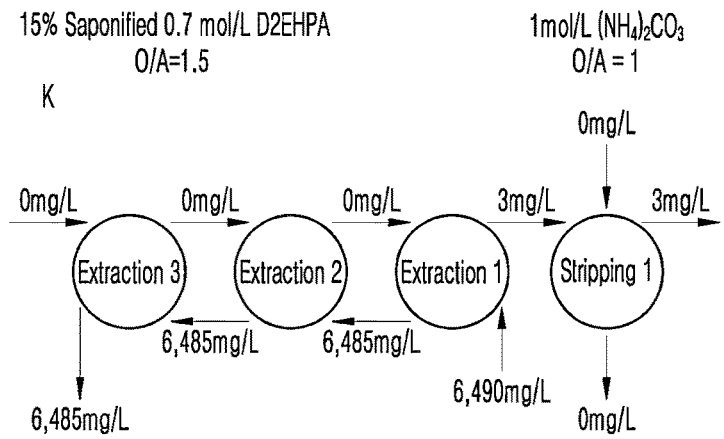

[FIG. 4]
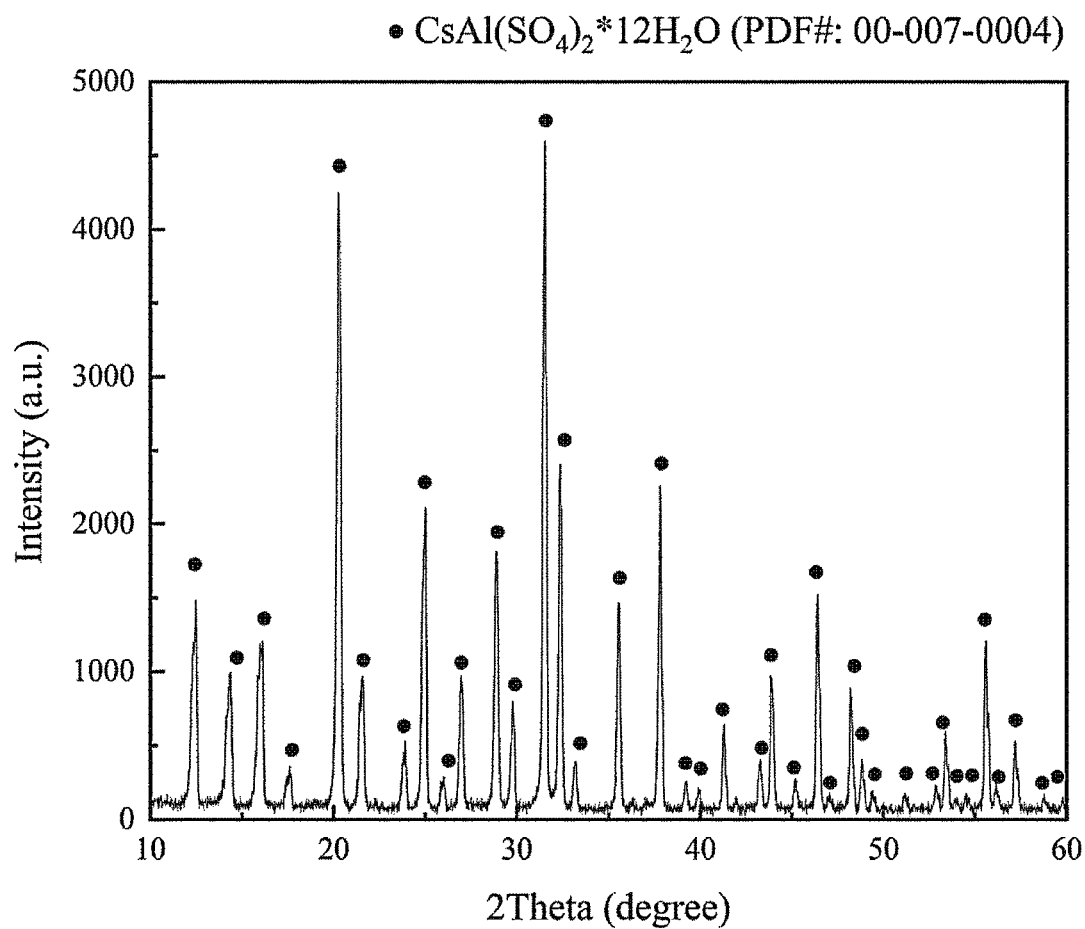

SELECTIVE RECOVERY METHOD OF VANADIUM AND CESIUM FROM WASTE SULFURIC ACID VANADIUM CATALYST, AND HIGH-QUALITY VANADIUM AQUEOUS SOLUTION AND CESIUM ALUM PRODUCED THEREBY

CROSS-REFERENCE TO RELATED APPLICATIONS

This application claims the priority of Korean Patent Application No. 10-2021-0145223 filed on Oct. 28, 2021, in the Korean Intellectual Property Office, the disclosure of which is incorporated herein by reference.

BACKGROUND OF THE INVENTION

Field of the Invention

The present disclosure relates to a selective recovery method of vanadium and cesium from a waste sulfuric acid vanadium catalyst, and a high-quality vanadium aqueous solution and cesium alum produced thereby, and more particularly, to a selective recovery method of vanadium and cesium from a waste sulfuric acid vanadium catalyst by a hydrometallurgical method including water leaching, solid-liquid separation, vanadium solvent extraction, vanadium selective stripping and cesium alum production, and a high-quality vanadium aqueous solution and cesium alum produced thereby.

Description of the Related Art

In general, vanadium has properties of high tensile strength and hardness, and fatigue resistance, and 85% or more of the total vanadium production has been consumed as an alloy raw material for ferrous or non-ferrous metals, and used as a raw material for catalysts in petrochemistry and various industries.

In particular, a sulfuric acid catalyst of vanadium is utilized as a catalyst used to oxidize $SO_2$ gas to $SO_3$ gas.

The sulfuric acid catalyst uses $SiO_2$ as a support, and $V_2O_5$ and oxides such as Na, K, and Cs are mixed in a certain ratio for the purpose of lowering a process temperature during the production of the sulfuric acid catalyst. In particular, when Cs is added to the sulfuric acid catalyst, the process temperature may be lowered by about 30 to 40° C. Based on this, a commercialized vanadium sulfate catalyst contains approximately 4 to 10% of $V_2O_5$, 15 to 20% of $K_2SO_4$ or $K_2S_2O_7$, 2 to 5% $Na_2SO_4$ or $Na_2S_2O_7$, 5 to 15% of $Cs_2SO_4$ or $Cs_2S_2O_7$, and 55 to 70% of $SiO_2$.

As generally known, the sulfuric acid vanadium catalyst after using is regenerated and used, but the entire amount thereof is discarded when the life of the catalyst expires or when the catalyst is damaged or worn out during the process.

In addition, cesium has been known as a lethal radioactive element to the human body, in the case of a radioactive isotope $^{137}Cs$, but most of cesium in nature exists as safe $^{133}Cs$.

Depending on a compound thereof, cesium has been applied to various industries, such as atomic clocks, solar cells, infrared detectors, spectrophotometers, fuel cells, special glass, phosphors, and water treatment.

Accordingly, the present applicants have conducted many studies with hard work and effort to recover vanadium and cesium used in various industries from a waste sulfuric acid catalyst, and obtained a selective recovery method of vanadium and cesium from a waste sulfuric acid vanadium catalyst by a hydrometallurgical method including water leaching, solid-liquid separation, vanadium solvent extraction, vanadium selective stripping and cesium alum production, and a high-quality vanadium aqueous solution and cesium alum produced thereby, and then completed the present disclosure.

SUMMARY OF THE INVENTION

An object of the present disclosure is to provide a recovery method of vanadium, which is consumed as a alloy raw material of ferrous or non-ferrous metals and used as a raw material for catalysts in petrochemistry and various industries, from a waste sulfuric acid vanadium catalyst by a hydrometallurgical method including water leaching, solid-liquid separation, vanadium solvent extraction, and vanadium selective stripping.

Another object of the present disclosure is to provide a vanadium aqueous solution produced from vanadium recovered by the vanadium recovery method so as to be applied to the industry.

Yet another object of the present disclosure is to provide a recovery method of cesium, which is applied to various industries such as atomic clocks, solar cells, infrared detectors, spectrophotometers, fuel cells, special glass, phosphors, and water treatment, from a waste sulfuric acid vanadium catalyst by a hydrometallurgical method including water leaching, solid-liquid separation, vanadium solvent extraction, vanadium selective stripping, and cesium alum production.

Still another object of the present disclosure is to provide cesium alum produced from cesium recovered by the cesium recovery method so as to be applied to the industry.

The objects of the present disclosure are not limited to the aforementioned object, and other objects, which are not mentioned above, will be apparent to those skilled in the art from the following description.

According to an aspect of the present disclosure, there is provided a selective recovery method of vanadium and cesium from a waste sulfuric acid vanadium catalyst by a hydrometallurgical method including water leaching, solid-liquid separation, vanadium solvent extraction, vanadium selective stripping and cesium alum production, the selective recovery method comprising the steps of: (a-1) crushing and pulverizing a waste sulfuric acid vanadium catalyst; (a-2) water-leaching the crushed and pulverized waste sulfuric acid vanadium catalyst and then solid-liquid separation to prepare a waste sulfuric acid vanadium water leachate; (a-3) adding an organic solvent as a cation exchange extractant to the waste sulfuric acid vanadium water leachate to obtain a vanadium organic extract from which vanadium is solvent-extracted and a raffinate aqueous solution remaining after the solvent extraction of vanadium; (a-4) preparing a vanadium aqueous solution by adding an alkali aqueous solution to the vanadium organic extract to selectively strip vanadium; and (a-5) selectively recovering cesium from cesium alum by adding an aluminum compound from the raffinate aqueous solution obtained after the vanadium solvent extraction.

In an embodiment of the present disclosure, in (a-1) the crushing and pulverizing of the waste sulfuric acid vanadium catalyst, the waste sulfuric acid vanadium catalyst may be crushed and pulverized by at least one device selected from the group consisting of Jaw Crusher, Gyratory Crusher, Roller Crusher, Cone Crusher, Hammermil Crusher, Tumbling Mill, Vibration Mill, Attrition Mill, Ball Mill, Rod Mill, Pebble Mill, and Autogeneous Mill to prepare the crushed and pulverized waste sulfuric acid vanadium catalyst, and the particle size of the crushed and pulverized waste sulfuric acid vanadium catalyst may be 10 to 500 mesh.

In an embodiment of the present disclosure, in (a-2) the water-leaching of the crushed and pulverized waste sulfuric acid vanadium catalyst and then solid-liquid separation to prepare the waste sulfuric acid vanadium water leachate and a leaching residue, the water-leaching condition may be 10 minutes to 12 hours under conditions of a reaction temperature of 25 to 80° C., a solid-liquid ratio of 1/10, and a stirring rate of 50 to 500 rpm by adding the crushed and pulverized waste sulfuric acid vanadium catalyst to water.

In an embodiment of the present disclosure, the vanadium leaching rate of the waste sulfuric acid vanadium water leachate may be 10 to 99.9%.

In an embodiment of the present disclosure, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the organic solvent may be at least one selected from the group consisting of 2-ethyl hexyl phosphonic acid (commercial name: PC88A), di-2-ethylhexyl phosphoric acid (commercial name: D2EHPA), mono-2-ethyl hexyl ester (commercial name: P507), bis-(2,4,4-trimethylpentyl) phosphinic acid (commercial name: Cyanex 272), alkyl monocarboxylic acid (commercial name: Versatic 10 acid), tributyl phosphate (commercial name: TBP), and trialkylphosphine oxide (commercial name: Cyanex923).

In an embodiment of the present disclosure, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the organic solvent may be an organic solvent having a degree of saponification of 1 to 15%, and may be at least one selected from the group consisting of 2-ethyl hexyl phosphonic acid (commercial name: PC88A), di-2-ethylhexyl phosphoric acid (commercial name: D2EHPA), mono-2-ethyl hexyl ester (commercial name: P507), bis-(2,4,4-trimethylpentyl) phosphinic acid (commercial name: Cyanex 272), alkyl monocarboxylic acid (commercial name: Versatic 10 acid), tributyl phosphate (commercial name: TBP), and trialkylphosphine oxide (commercial name: Cyanex923).

In an embodiment of the present disclosure, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the experimental condition for extracting vanadium with the organic solvent may be 2 minutes to 30 minutes under the conditions of a reaction temperature of 15 to 40° C., O (organic phase)/A (water phase)=1 to 4, and a stirring rate of 50 to 500 rpm by adding the organic solvent to the waste sulfuric acid vanadium water leachate.

In an embodiment of the present disclosure, the vanadium extraction rate of the vanadium organic extract extracted using the organic solvent may be 25 to 95% at pH 1 to 6.

In an embodiment of the present disclosure, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the experimental condition for extracting vanadium with the organic solvent may be 2 minutes to 30 minutes under the conditions of a reaction temperature of 15 to 40° C., O (organic phase)/A (water phase)=1 to 4, and a stirring rate of 50 to 500 rpm by adding the organic solvent having the degree of saponification of 1 to 15% to the waste sulfuric acid vanadium water leachate.

In an embodiment of the present disclosure, the vanadium extraction rate of the vanadium organic extract extracted using the organic solvent having the degree of saponification of 1 to 15% may be 65 to 99.5%.

In an embodiment of the present disclosure, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the raffinate aqueous solution may contain Na, Cs, or K.

In an embodiment of the present disclosure, in (a-4) the preparing of the vanadium aqueous solution by adding the alkali aqueous solution to the vanadium organic extract to selectively strip vanadium, the alkali aqueous solution may be at least one alkali aqueous solution selected from the group consisting of $(NH_4)_2CO_3$, NaOH, and $Na_2CO_3$ in a concentration range of 0.05 to 5 M.

In an embodiment of the present disclosure, the vanadium stripping rate of the vanadium aqueous solution may be 70 to 99.99%.

In an embodiment of the present disclosure, in (a-5) the selectively recovering of the cesium from the cesium alum by adding the aluminum compound from the raffinate aqueous solution obtained after the solvent extraction of vanadium, the aluminum compound may be at least one selected from the group consisting of aluminum chloride, sodium aluminate, aluminum powder, aluminum hydroxide, aluminum sulfate, and alumina.

In an embodiment of the present disclosure, when the cesium alum is formed in the (a-5) raffinate aqueous solution, the cesium precipitation rate may be 60 to 98%.

In an embodiment of the present disclosure, the purity of the cesium alum may be 90 to 99.1%.

According to another aspect of the present disclosure, there is provided a vanadium aqueous solution produced by the selective recovery method of vanadium and cesium from the sulfuric acid vanadium catalyst.

According to yet another aspect of the present disclosure, there is provided cesium alum produced by the selective recovery method of vanadium and cesium from the sulfuric acid vanadium catalyst.

According to the present disclosure, since there is provided a recovery method of vanadium, which is consumed as a alloy raw material of ferrous or non-ferrous metals and used as a raw material for catalysts in petrochemistry and various industries, from a waste sulfuric acid vanadium catalyst by a hydrometallurgical method including water leaching, solid-liquid separation, vanadium solvent extraction, and vanadium selective stripping, it is possible to reduce waste treatment costs and to reduce vanadium recovery costs.

In addition, since there is provided a vanadium aqueous solution produced from vanadium recovered by the vanadium recovery method so as to be applied to the industry, the scope of application is wide.

Further, since there is provided a recovery method of cesium, which is applied to various industries such as atomic clocks, solar cells, infrared detectors, spectrophotometers, fuel cells, special glass, phosphors, and water treatment, from a waste sulfuric acid vanadium catalyst by a hydrometallurgical method including water leaching, solid-liquid separation, vanadium solvent extraction, vanadium selective stripping, and cesium alum production, the method is environmentally friendly and economical.

Further, since there is provided cesium alum produced from cesium recovered by the cesium recovery method so as to be applied to the industry, the scope of application is wide.

It should be understood that the effects of the present disclosure are not limited to the effects, but include all effects that can be deduced from the detailed description of the present disclosure or configurations of the present disclosure described in appended claims.

BRIEF DESCRIPTION OF THE DRAWINGS

FIG. 1 is a process flowchart of a recovery method of vanadium and cesium from a waste sulfuric acid vanadium catalyst according to an embodiment of the present disclosure.

FIG. 2 is an XRD crystal structure analysis graph of the waste sulfuric acid vanadium catalyst according to an embodiment of the present disclosure.

FIG. 3A is mass balance data of V and Fe in an organic solvent extraction process according to an embodiment of the present disclosure.

FIG. 3B is mass balance data of Ca and Al in an organic solvent extraction process according to an embodiment of the present disclosure.

FIG. 3C is mass balance data of Si and Ti in an organic solvent extraction process according to an embodiment of the present disclosure.

FIG. 3D is mass balance data of Na and Cs in an organic solvent extraction process according to an embodiment of the present disclosure.

FIG. 3E is mass balance data of K in an organic solvent extraction process according to an embodiment of the present disclosure.

FIG. 4 is an XRD crystal structure analysis graph of cesium alum according to an embodiment of the present disclosure.

DETAILED DESCRIPTION OF THE PREFERRED EMBODIMENT

Hereinafter, preferred embodiments of the present disclosure will be described in detail with reference to the accompanying drawings.

Advantages and features of the present disclosure, and methods for accomplishing the same will be more clearly understood from exemplary embodiments to be described below in detail with reference to the accompanying drawings.

However, the present disclosure is not limited to the following exemplary embodiments but may be implemented in various different forms. The exemplary embodiments are provided only to make description of the present disclosure complete and to fully provide the scope of the present disclosure to a person having ordinary skill in the art to which the present disclosure pertains with the category of the invention, and the present disclosure will be defined by the appended claims.

In the following description of the present disclosure, a detailed description of known arts related thereto will be omitted when it is determined to make the subject matter of the present disclosure rather unclear.

Hereinafter, the present disclosure will be described in detail.

Selective Recovery Method of Vanadium and Cesium from Waste Sulfuric Acid Vanadium Catalyst The present disclosure provides a recovery method of vanadium, which is consumed as a alloy raw material of ferrous or non-ferrous metals and used as a raw material for catalysts in petrochemistry and various industries, from a waste sulfuric acid vanadium catalyst by a hydrometallurgical method including water leaching, solid-liquid separation, vanadium solvent extraction, and vanadium selective stripping.

Further, the present disclosure provides a recovery method of cesium, which is applied to various industries such as atomic clocks, solar cells, infrared detectors, spectrophotometers, fuel cells, special glass, phosphors, and water treatment, from a waste sulfuric acid vanadium catalyst by a hydrometallurgical method including water leaching, solid-liquid separation, vanadium solvent extraction, vanadium selective stripping, and cesium alum production.

The selective recovery method of vanadium and cesium from the waste sulfuric acid vanadium catalyst of the present disclosure is a selective recovery method of vanadium and cesium from a waste sulfuric acid vanadium catalyst by a hydrometallurgical method including water leaching, solid-liquid separation, vanadium solvent extraction, vanadium selective stripping, and cesium alum production, The selective recovery method includes steps of: (a-1) crushing and pulverizing the waste sulfuric acid vanadium catalyst; (a-2) water-leaching the crushed and pulverized waste sulfuric acid vanadium catalyst and then solid-liquid separating to prepare a waste sulfuric acid vanadium water leachate; (a-3) adding an organic solvent as a cation exchange extractant to the waste sulfuric acid vanadium water leachate to obtain a vanadium organic extract from which vanadium is solvent-extracted and a raffinate aqueous solution remaining after the solvent extraction of vanadium; (a-4) preparing a vanadium aqueous solution by adding an alkali aqueous solution to the vanadium organic extract to selectively strip vanadium; and (a-5) selectively recovering cesium from cesium alum by adding an aluminum compound from the raffinate aqueous solution obtained after the solvent extraction of vanadium.

Since the present disclosure provides a recovery method of vanadium, which is consumed as a alloy raw material of ferrous or non-ferrous metals and used as a raw material for catalysts in petrochemistry and various industries, from a waste sulfuric acid vanadium catalyst by a hydrometallurgical method including water leaching, solid-liquid separation, vanadium solvent extraction, and vanadium selective stripping, it is possible to reduce waste treatment costs and to reduce vanadium recovery costs.

Further, since the present disclosure provides a recovery method of cesium, which is applied to various industries such as atomic clocks, solar cells, infrared detectors, spectrophotometers, fuel cells, special glass, phosphors, and water treatment, from a waste sulfuric acid vanadium catalyst by a hydrometallurgical method including water leaching, solid-liquid separation, vanadium solvent extraction, vanadium selective stripping, and cesium alum production, the method is environmentally friendly and economical.

Here, the waste sulfuric acid vanadium catalyst may contain, for example, 3.51% V, 0.5% Fe, 0.42% Ca, 22.8%

Si, 0.75% Al, 0.04% Ti, 5.8% K, 1.5% Na, and 2.2% Cs, and in XRD crystal structure analysis, $SiO_2$ existed as a main peak, and consists of various crystal phases such as $V_2O_5$ and $KAl(SO_4)_2$.

In addition, in (a-1) the crushing and pulverizing of the waste sulfuric acid vanadium catalyst, the waste sulfuric acid vanadium catalyst is crushed and pulverized by at least one device selected from the group consisting of Jaw Crusher, Gyratory Crusher, Roller Crusher, Cone Crusher, Hammermil Crusher, Tumbling Mill, Vibration Mill, Attrition Mill, Ball Mill, Rod Mill, Pebble Mill, and Autogeneous Mill to prepare the crushed and pulverized waste sulfuric acid vanadium catalyst, and the particle size of the crushed and pulverized waste sulfuric acid vanadium catalyst may be 10 to 500 mesh.

In this case, the particle size of the crushed and pulverized waste sulfuric acid vanadium catalyst may be preferably 20 to 400 mesh, more preferably 30 to 300 mesh.

In addition, in (a-2) the water-leaching of the crushed and pulverized waste sulfuric acid vanadium catalyst and then solid-liquid separating to prepare the waste sulfuric acid vanadium water leachate and a leaching residue, the water-leaching condition may be 10 minutes to 12 hours under conditions of a reaction temperature of 25 to 80° C., a solid-liquid ratio of 1/10, and a stirring rate of 50 to 500 rpm by adding the crushed and pulverized waste sulfuric acid vanadium catalyst to water.

Here, when the water leaching condition is out of the above range, there may be disadvantages in that the water leaching efficiency decreases and it is not economical.

In addition, the vanadium leaching rate of the waste sulfuric acid vanadium water leachate may be 10 to 99.9%.

In this case, the vanadium leaching rate of the waste sulfuric acid vanadium water leachate may be increased when the reaction temperature is 25 to 50° C. as compared with when the reaction temperature is 50 to 80° C.

In addition, the vanadium leaching rate of the waste sulfuric acid vanadium water leachate may be increased when the reaction time is 5 to 90 minutes as compared with when the reaction time is 90 to 360 minutes.

In addition, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the organic solvent may be at least one selected from the group consisting of 2-ethyl hexyl phosphonic acid (commercial name: PC88A), di-2-ethylhexyl phosphoric acid (commercial name: D2EHPA), mono-2-ethyl hexyl ester (commercial name: P507), bis-(2,4,4-trimethylpentyl) phosphinic acid (commercial name: Cyanex 272), alkyl monocarboxylic acid (commercial name: Versatic 10 acid), tributyl phosphate (commercial name: TBP), and trialkylphosphine oxide (commercial name: Cyanex923).

Here, kerosene may be used as a diluent in the organic solvent extraction.

In addition, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the organic solvent is an organic solvent having a degree of saponification of 1 to 15%, and may be at least one selected from the group consisting of 2-ethyl hexyl phosphonic acid (commercial name: PC88A), di-2-ethylhexyl phosphoric acid (commercial name: D2EHPA), mono-2-ethyl hexyl ester (commercial name: P507), bis-(2,4,4-trimethylpentyl) phosphinic acid (commercial name: Cyanex 272), alkyl monocarboxylic acid (commercial name: Versatic 10 acid), tributyl phosphate (commercial name: TBP), and trialkylphosphine oxide (commercial name: Cyanex923).

In addition, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the experimental condition for extracting vanadium with the organic solvent may be 2 minutes to 30 minutes under the conditions of a reaction temperature of 15 to 40° C., O (organic phase)/A (water phase)=1 to 4, and a stirring rate of 50 to 500 rpm by adding the organic solvent to the waste sulfuric acid vanadium water leachate.

Here, when the organic solvent extraction experimental condition is out of the above range, there may be disadvantages in that the vanadium extraction efficiency may decrease and it is not economical.

In addition, the vanadium extraction rate of the vanadium organic extract extracted using the organic solvent may be 25 to 95% at pH 1 to 6.

In this case, the vanadium extraction rate of the vanadium organic extract extracted using the organic solvent may be increased when the pH is 1 to 3 as compared to when the pH is 3 to 6.

In addition, the vanadium extraction rate of the vanadium organic extract extracted using the organic solvent may increase as the concentration of the organic solvent increases from 0.01 M to 5 M.

In addition, the vanadium extraction rate of the vanadium organic extract extracted using the organic solvent may increase as the O (organic phase)/A (water phase) ratio increases from 0.05 to 10.

In addition, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the experimental condition for extracting vanadium with the organic solvent may be 2 minutes to 30 minutes under the conditions of a reaction temperature of 15 to 40° C., O (organic phase)/A (water phase)=1 to 4, and a stirring rate of 50 to 500 rpm by adding the organic solvent having the degree of saponification of 1 to 15% to the waste sulfuric acid vanadium water leachate.

Here, when the organic solvent extraction experimental condition having the degree of saponification of 1 to 15% is out of the above range, there may be a disadvantage that it is not economical.

In addition, the vanadium extraction rate of the vanadium organic extract extracted using the organic solvent having the degree of saponification of 1 to 15% may be 65 to 99.5%.

At this time, the vanadium extraction rate of the vanadium organic extract extracted using the organic solvent having the degree of saponification of 1 to 15% may increase as the degree of saponification increases from 1% to 15%.

In addition, the vanadium extraction rate of the vanadium organic extract extracted using the organic solvent having the degree of saponification of 1 to 15% may increase in a countercurrent 3-stage extraction method as compared with a countercurrent 2-stage extraction method when extracted by a countercurrent 2-stage extraction method, and may increase in the countercurrent 2-stage extraction method as compared with a countercurrent 1-stage extraction method.

In addition, the countercurrent extraction method is a reverse current extraction method. That is, the countercurrent extraction method is an extraction method in which flow directions of two fluids are opposite to each other.

Here, the countercurrent 3-stage extraction method may be a method in which when a feed solution is added in a first stage, the extractant is added in a third stage. In this case, the countercurrent 3-stage extraction method may further selectively concentrate and purify metal ions.

In addition, in (a-3) the adding of the organic solvent as the cation exchange extractant to the waste sulfuric acid vanadium water leachate to obtain the vanadium organic extract from which vanadium is solvent-extracted and the raffinate aqueous solution remaining after the solvent extraction of vanadium, the raffinate aqueous solution may contain Na, Cs, or K.

Here, the raffinate aqueous solution may be a residual solution remaining after the solvent extraction of vanadium.

In addition, in (a-4) the preparing of the vanadium aqueous solution by adding the alkali aqueous solution to the vanadium organic extract to selectively strip vanadium, the alkali aqueous solution may be at least one alkali aqueous solution selected from the group consisting of $(NH_4)_2CO_3$, NaOH, and $Na_2CO_3$ in a concentration range of 0.05 to 5 M.

At this time, when the concentration of the alkali aqueous solution is 0.7 to 5 M as compared with when the concentration of the alkali aqueous solution is 0.05 to 0.7 M, the stripping efficiency of vanadium may be increased.

In addition, when the O/A ratio of the alkali aqueous solution is 1 to 2, the stripping efficiency of vanadium may be increased as compared to the case where the O/A ratio of the alkali aqueous solution is 2 to 3.

In addition, the vanadium stripping rate of the vanadium aqueous solution may be 70 to 99.99%.

In addition, in (a-5) the selectively recovering of the cesium from the cesium alum by adding the aluminum compound from the raffinate aqueous solution obtained after the solvent extraction of vanadium, the aluminum compound may be at least one selected from the group consisting of aluminum chloride, sodium aluminate, aluminum powder, aluminum hydroxide, aluminum sulfate, and alumina.

In addition, when the cesium alum is formed in the (a-5) raffinate aqueous solution, the cesium precipitation rate may be 60 to 98%.

Here, as the content of the aluminum compound increases, the cesium precipitation rate may increase.

In addition, the purity of the cesium alum may be 90 to 99.1%.

FIG. 1 is a process flowchart of a recovery method of vanadium and cesium from a waste sulfuric acid vanadium catalyst according to an embodiment of the present disclosure.

Referring to FIG. 1, a waste sulfuric acid vanadium catalyst 100 is crushed and pulverized (110) with a crushing and pulverizing device, and then added in water to water-leach (120) vanadium and metal ions.

Then, a water leachate in which the vanadium and the metal ions are water-leached may be solid-liquid separated (130) to be separated into a water leachate 140 and a leaching residue 150.

Thereafter, an organic solvent is added to the water leachate 140 to extract (160) vanadium and then form an organic extract 170, and obtain a raffinate aqueous solution 210 remaining after extracting vanadium.

An alkali aqueous solution is added to the organic extract 170 to selectively strip (180) vanadium and then a high-quality vanadium aqueous solution 190 is produced to selectively recover vanadium from the waste sulfuric acid vanadium catalyst.

In addition, sulfuric acid aluminum powder was added to the raffinate aqueous solution 210, reacted, and then solid-liquid separated to produce cesium alum ($CsAl(SO_4)_2$) and selectively recover cesium from the waste sulfuric acid vanadium catalyst.

High-Quality Vanadium Aqueous Solution and Cesium Alum Produced by Selective Recovery Method of Vanadium and Cesium from Waste Sulfuric Acid Vanadium Catalyst The present disclosure provides a vanadium aqueous solution produced from vanadium recovered by the vanadium recovery method so as to be applied to the industry.

In addition, since the present disclosure provides the vanadium aqueous solution produced from vanadium recovered by the vanadium recovery method so as to be applied to the industry, the scope of application is wide.

Further, the present disclosure provides cesium alum produced from cesium recovered by the cesium recovery method so as to be applied to the industry.

Further, since the present disclosure provides the cesium alum produced from cesium recovered by the cesium recovery method so as to be applied to the industry, the scope of application is wide.

Specifically, the present disclosure provides a vanadium aqueous solution produced by the selective recovery method of vanadium and cesium from the sulfuric acid vanadium catalyst.

Further, the present disclosure provides cesium alum produced by the selective recovery method of vanadium and cesium from the sulfuric acid vanadium catalyst.

Hereinafter, the present disclosure will be described in more detail with reference to Examples. However, the following Examples are for explaining the present disclosure in more detail, and the scope of the present disclosure is not limited by the following Examples. The following Examples can be appropriately modified and changed by those skilled in the art within the scope of the present disclosure.

<Preparation Example>

In order to selectively recover vanadium and cesium from a vanadium sulfate catalyst, the waste sulfuric acid vanadium catalyst was first prepared.

A composition of the waste sulfuric acid vanadium catalyst was shown in Table 1 below.

As shown in Table 1 below, the waste sulfuric acid vanadium catalyst contained, for example, 3.51% V, 0.5% Fe, 0.42% Ca, 22.8% Si, 0.75% Al, 0.04% Ti, 5.8% K, 1.5% Na, and 2.2% Cs, and as illustrated in FIG. 2, $SiO_2$ existed as a main peak, and consisted of various crystal phases such as $V_2O_5$ and $KAl(SO_4)_2$.

FIG. 2 is an XRD crystal structure analysis graph of the waste sulfuric acid vanadium catalyst of Preparation Example.

TABLE 1

| Elements | V | Fe | Ca | Si | Al | Ti | K | Na | Cs |
|---|---|---|---|---|---|---|---|---|---|
| wt. % | 3.51 | 0.5 | 0.42 | 22.8 | 0.75 | 0.04 | 5.8 | 1.5 | 2.2 |

EXAMPLES

<Example 1> Water-Leaching of Waste Sulfuric Acid Vanadium Catalyst

The waste sulfuric acid vanadium catalyst of Preparation Example was crushed and pulverized using a ball mill, and then particle size separation was performed on the basis of 100 mesh using a sieve shaker. A water leaching experiment was performed on powder with a particle size smaller than 100 mesh, and particles larger than 100 mesh were again added into a ball mill and crushed and pulverized.

The water leaching experiment was performed for 6 hours at a reaction temperature of 25 to 80° C., as shown in Tables 2 to 4 below, under the conditions of a solid-liquid ratio of 1/10 and a stirring rate of 200 rpm.

Leaching Rates when Water-Leaching Waste Sulfuric Acid Vanadium Catalyst with Distilled Water at Solid-Liquid Ratio of 1/10, Stirring Rate of 200 Rpm, and 25° C.

TABLE 2

| min | V | Fe | Ca | Si | Al | Ti | Na | K | Cs | pH |
|---|---|---|---|---|---|---|---|---|---|---|
| 5 | 86.4 | 25.9 | 52.4 | 0.01 | 20.0 | 46.8 | 94.7 | 72.6 | 81.5 | 1.35 |
| 10 | 92.2 | 26.7 | 56.1 | 0.01 | 20.3 | 44.8 | 95.4 | 77.5 | 85.0 | 1.41 |
| 20 | 97.0 | 27.2 | 63.1 | 0.01 | 19.9 | 43.3 | 98.8 | 85.2 | 95.4 | 1.4 |
| 30 | 99.6 | 28.7 | 67.4 | 0.01 | 20.8 | 45.3 | 100 | 88.8 | 100 | 1.45 |
| 45 | 92.7 | 27.1 | 64.2 | 0.02 | 20.9 | 43.3 | 98.8 | 86.8 | 99.2 | 1.44 |
| 60 | 93.3 | 29.8 | 69.3 | 0.01 | 21.2 | 43.3 | 100 | 88.2 | 99.6 | 1.46 |
| 90 | 93.5 | 30.1 | 69.3 | 0.02 | 22.2 | 42.5 | 99.4 | 88.3 | 98.1 | 1.46 |
| 120 | 93.6 | 30.6 | 70.0 | 0.02 | 22.9 | 42.0 | 100 | 88.5 | 97.7 | 1.44 |
| 180 | 89.0 | 33.0 | 71.9 | 0.02 | 23.7 | 38.3 | 99.4 | 86.2 | 96.9 | 1.45 |
| 240 | 85.7 | 34.8 | 71.3 | 0.02 | 24.8 | 36.3 | 100 | 85.8 | 96.5 | 1.45 |
| 360 | 78.7 | 36.8 | 73.1 | 0.02 | 27.3 | 32.6 | 99.4 | 86.0 | 96.2 | 1.41 |

Table 2 showed leaching rates when water-leaching the waste sulfuric acid vanadium catalyst with distilled water at a solid-liquid ratio of 1/10, a stirring rate of 200 rpm, and 25° C.

Referring to Table 2, when a waste catalyst V was leached at 25° C. using tertiary distilled water, the leaching rate of V at 30 minutes was 99.6%. At this time, Fe 28.7%, Ca 67.4%, Si 0.01%, Al 20.8%, Ti 45.3%, Na 99.9%, K 88.8%, and Cs 99.9% were leached. The leaching amount of V decreased after 30 minutes, and on the contrary, in the case of impurities such as Fe, Ca, and Al, the concentration in the leachate increased over time.

Leaching Rates when Water-Leaching Waste Sulfuric Acid Vanadium Catalyst with Distilled Water at Solid-Liquid Ratio of 1/10, Stirring Rate of 200 Rpm, and 50° C.

TABLE 3

| min | V | Fe | Ca | Si | Al | Ti | Na | K | Cs | pH |
|---|---|---|---|---|---|---|---|---|---|---|
| 5 | 44.7 | 23.5 | 46.1 | 0 | 16.5 | 0 | 95.3 | 78.0 | 89.3 | 1.27 |
| 10 | 48.3 | 25.4 | 54.8 | 0 | 20.0 | 0 | 95.9 | 89.4 | 90.0 | 1.24 |
| 20 | 37.4 | 27.1 | 56.3 | 0 | 22.4 | 0 | 97.7 | 88.6 | 85.9 | 1.22 |
| 30 | 31.2 | 28.6 | 56.1 | 0 | 26.5 | 0 | 99.4 | 83.9 | 93.7 | 1.25 |
| 45 | 29.8 | 32.5 | 58.0 | 0 | 28.3 | 0 | 99.4 | 81.9 | 89.6 | 1.21 |
| 60 | 28.4 | 37.2 | 58.5 | 0 | 31.9 | 0 | 100.6 | 83.5 | 85.6 | 1.29 |
| 90 | 27.3 | 40.5 | 60.0 | 0 | 35.5 | 0 | 98.3 | 84.5 | 77.8 | 1.25 |
| 120 | 25.2 | 46.8 | 62.5 | 0 | 40.8 | 0 | 97.7 | 85.9 | 75.2 | 1.15 |
| 180 | 24.2 | 52.3 | 62.6 | 0 | 46.4 | 0 | 98.8 | 92.7 | 73.3 | 1.14 |
| 240 | 23.2 | 56.4 | 62.8 | 0 | 50.0 | 0 | 98.8 | 87.2 | 71.5 | 1.11 |
| 360 | 23.2 | 62.8 | 63.0 | 0 | 56.3 | 0 | 98.8 | 96.6 | 71.9 | 1.24 |

Table 3 showed leaching rates when water-leaching the waste sulfuric acid vanadium catalyst with distilled water at a solid-liquid ratio of 1/10, a stirring rate of 200 rpm, and 50° C.

Referring to Table 3 above, when leaching at 50° C., the leaching rate of V decreased over time, and finally, the leaching rate of 23.2% was shown, and the leaching rate of Cs decreased from up to 90% to 71.9%. In addition, the leaching rates of Fe, Ca, Al, Na and K continuously increased over time, and at 360 minutes, Fe 62.8%, Ca 63%, Al 56.3%, Na 98.8%, and K 96.6% were leached.

Leaching Rates when Water-Leaching Waste Sulfuric Acid Vanadium Catalyst with Distilled Water at Solid-Liquid Ratio of 1/10, Stirring Rate of 200 Rpm, and 80° C.

TABLE 4

| min | V | Fe | Ca | Si | Al | Ti | Na | K | Cs | pH |
|---|---|---|---|---|---|---|---|---|---|---|
| 5 | 10.9 | 24.6 | 41.3 | 0 | 39.8 | 0 | 96.5 | 78.0 | 79.2 | 1.18 |
| 10 | 13.6 | 34.8 | 51.8 | 0 | 54.8 | 0 | 99.4 | 89.4 | 81.1 | 1.19 |
| 20 | 13.4 | 44.4 | 55.1 | 0 | 66.3 | 0 | 100.2 | 88.6 | 80.0 | 1.27 |
| 30 | 12.7 | 47.8 | 56.2 | 0 | 76.2 | 0 | 98.8 | 83.9 | 79.2 | 1.17 |
| 45 | 12.3 | 51.0 | 57.6 | 0 | 81.5 | 0 | 99.4 | 81.9 | 80.0 | 1.18 |
| 60 | 12.2 | 54.4 | 58.0 | 0 | 86.1 | 0 | 100.6 | 83.5 | 81.1 | 1.11 |
| 90 | 12.0 | 56.2 | 59.7 | 0 | 93.1 | 0 | 98.2 | 84.5 | 75.5 | 1.09 |
| 120 | 11.4 | 55.7 | 59.3 | 0 | 94.1 | 0 | 98.8 | 85.9 | 73.2 | 1.1 |

TABLE 4-continued

| min | V | Fe | Ca | Si | Al | Ti | Na | K | Cs | pH |
|---|---|---|---|---|---|---|---|---|---|---|
| 180 | 11.6 | 57.4 | 62.1 | 0 | 99.3 | 0 | 99.4 | 92.7 | 72.5 | 1.14 |
| 240 | 10.8 | 54.7 | 61.1 | 0 | 98.8 | 0 | 99.4 | 87.2 | 72.5 | 1.06 |
| 360 | 10.8 | 54.7 | 62.3 | 0 | 99.7 | 0 | 98.8 | 96.6 | 71.7 | 1.15 |

Table 4 showed leaching rates when water-leaching the waste sulfuric acid vanadium catalyst with distilled water at a solid-liquid ratio of 1/10, a stirring rate of 200 rpm, and 80° C.

Referring to Table 4 above, it could be seen that when water-leached under a condition of 80° C., the leaching rate of V was maintained at a very low level of about 10%, and in the case of Cs, the leaching rate of about 71.7% at 360 minutes was shown. In addition, in Fe, Ca, Al, Na, and K, the leaching rates increased over time, and Fe 54.7%, Ca 62.3%, Al 99.7%, Na 98.8%, and K 96.6% were leached at 360 minutes.

As a result of the water-leaching experiment of the waste sulfuric acid vanadium catalyst according to a reaction temperature, it could be seen that the leaching rate of V decreased significantly as the reaction temperature increased, and it could also be seen that Cs showed the highest leaching rate of 99.9% or more at 25° C.

In addition, since the leaching rate of V decreased after 30 minutes even under the condition of 25° C., optimum conditions in the water leaching experiment to recover V and Cs from the waste sulfuric acid vanadium catalyst were the reaction temperature of 25° C. and the reaction time of 30 minutes.

<Example 2> Organic Solvent Extraction of Waste Sulfuric Acid Vanadium Water Leachate An organic solvent was added to the waste sulfuric acid vanadium water leachate of Example 1 to extract vanadium with the organic solvent.

Here, a composition of the waste sulfuric acid vanadium water leachate of Example 1 was a leachate composition shown in Table 5 below when the waste sulfuric acid vanadium catalyst was water-leached with distilled water at a solid-liquid ratio of 1/10, a stirring rate of 200 rpm and 25° C. for 30 minutes.

TABLE 5

| | V | Fe | Ca | Si | Al | Ti | Na | Cs | K | pH |
|---|---|---|---|---|---|---|---|---|---|---|
| Feed | 3518 | 130.9 | 285.6 | 12.4 | 190.7 | 16.8 | 1600 | 2600 | 6490 | 1.5 |

Referring to Table 5 above, in the waste sulfuric acid vanadium water leachate of Example 1, V 3518 mg/L, Fe 130.9 mg/L, Ca 285.6 mg/L, Si 12.4 mg, Al 190.7 mg/L, Ti 16.8 mg/L, Na 1600 mg/L, Cs 2600 mg/L, and K 6490 mg/L were contained.

In addition, an experiment was performed to determine the extraction tendency of valuable metals according to an equilibrium pH. 100 mL of a leaching solution (Feed) and 100 mL of 1 M (mol/L) di-2-ethylhexyl phosphoric acid (D2EHPA) were added to a 250 mL beaker (O/A=1) and stirred at a rate of 250 to 500 rpm using a magnetic bar so that the extraction reaction could be sufficiently performed.

The water leachate used a solution obtained after the reaction time of 30 minutes at the reaction temperature of 25° C., which were the optimum leaching conditions. The equilibrium pH was adjusted using an ammonia aqueous solution, and when a target pH was reached, extraction was performed for 10 minutes and then phase separation was performed in a separation funnel.

This process was continuously performed for each equilibrium pH. Table 6 below showed the extraction rates of valuable metals according to an equilibrium pH.

Extraction Rates when Performing Organic Solvent Extraction of Waste Sulfuric Acid Vanadium Water Leachate with Organic Solvent D2EHPA at O/A=1 and Stirring Rate of 250 to 500 Rpm

TABLE 6

| Eq. pH | V | Fe | Ca | Si | Al | Ti | Na | Cs | K |
|---|---|---|---|---|---|---|---|---|---|
| 1.28 | 75.4 | 99.0 | 39.5 | 64.3 | 11.3 | 100 | 0.0 | 0.0 | 0.0 |
| 1.51 | 80.6 | 100 | 52.7 | 63.5 | 35.3 | 100 | 0.1 | 0.0 | 0.0 |
| 2.15 | 90.9 | 100 | 92.6 | 54.8 | 93.2 | 100 | 0.2 | 0.0 | 0.0 |
| 2.58 | 93.7 | 100 | 97.9 | 55.7 | 100 | 100 | 0.1 | 1.8 | 0.1 |
| 3 | 92.5 | 100 | 99.0 | 46.1 | 100 | 100 | 3.8 | 5.3 | 0.2 |
| 3.47 | 74.4 | 100 | 100 | 47.8 | 100 | 100 | 9.1 | 2.5 | 6.0 |
| 4.04 | 57.2 | 100 | 100 | 37.4 | 100 | 100 | 12.5 | 11.3 | 12.0 |
| 4.5 | 50.2 | 100 | 100 | 12.2 | 100 | 100 | 15.6 | 0.0 | 15.0 |
| 5.02 | 29.9 | 100 | 100 | 0.0 | 100 | 100 | 23.2 | 17.8 | 25.8 |
| 5.51 | 0 | 100 | 100 | 0 | 100 | 100 | 30.0 | 19.3 | 33.4 |

Table 6 above showed extraction rates when performing organic solvent extraction of the waste sulfuric acid vanadium water leachate with 1 mol/L D2EHPA at O/A=1 and a stirring rate of 250 to 500 rpm.

As can be seen from Table 6 above, when 1 mol/L D2EHPA was used, an initial equilibrium pH was 1.28, and at this time, 75.4% V, 99% Fe, 39.5% Ca, 64.3% Si, and 11.3% Al were extracted, Ti was fully extracted, and Na, Cs, and K were not extracted.

When the extraction rates of valuable metals were compared by equilibrium pH, Ti and Fe were first extracted, and alkali metals Na, Cs, and K were extracted since the equilibrium pH reached 3 or more after V, Al, and Ca were extracted.

When the equilibrium pH was 2.58, the extraction rate of V was highest. In the pH section higher than the equilibrium pH, the extraction rate of V decreased as the pH increased. This was because vanadium was back-extracted to an aqueous solution from the organic phase, and when the equilibrium pH reached 5.51, V in the organic phase was fully back-extracted and analyzed similarly to the feed composition. At this time, trace Si was back-extracted together, and Fe, Ca, Al and Ti were still remaining in the organic phase.

Extraction Rates when Performing Organic Solvent Extraction of Waste Sulfuric Acid Vanadium Water Leachate with Organic Solvent D2EHPA by Concentration at O/A=1 and Stirring Rate of 250 to 500 Rpm The extraction behavior of valuable metals according to the concentration of D2EHPA was examined by performing solvent extraction under a condition of O/A=1 using D2EHPA of 0.35, 0.5, 0.7, and 1 M of concentrations. The solvent extraction experiment was performed for 10 minutes in a 125 mL separation funnel. Table 7 below showed extraction rates of valuable metals according to a concentration of D2EHPA.

TABLE 7

| Conc. D2EHPA (mol/L) | V | Fe | Ca | Si | Al | Ti | Na | Cs | K | pH |
|---|---|---|---|---|---|---|---|---|---|---|
| 0.35 | 54.9 | 97.5 | 1.4 | 66.5 | 7.7 | 100.0 | 0.1 | 0.0 | 0.2 | 1.38 |
| 0.5 | 63.2 | 99.7 | 9.4 | 68.1 | 9.7 | 100.0 | 0.0 | 0.0 | 0.2 | 1.31 |
| 0.7 | 69.7 | 100.0 | 24.2 | 64.9 | 8.8 | 100.0 | 0.0 | 0.0 | 0.8 | 1.30 |
| 1 | 74.6 | 100.0 | 41.3 | 66.0 | 20.1 | 100.0 | 0.1 | 0.4 | 0.6 | 1.29 |

Table 7 above showed extraction rates when performing the organic solvent extraction of the waste sulfuric acid vanadium water leachate with D2EHPA of 0.35, 0.5, 0.7, and 1 M of concentrations at O/A=1 and a stirring rate of 250 to 500 rpm.

As shown in Table 7, in the case of V, the extraction rates were 54.9%, 63.2%, 69.7%, and 74.6% at 0.35, 0.5, 0.7, and 1 mol/L D2EHPA, respectively, and the higher the concentration of D2EHPA, the higher the extraction rate. In the case of Fe, it was confirmed that 97.5% was extracted in 0.35 mol/L D2EHPA, and the whole amount was extracted from 0.7 mol/L. Even in the case of Ca and Al, since the extraction rate increased as the concentration of D2EHPA increased, about 41.3% and 20.1% were extracted at 1 mol/L, and the whole amount of Ti was extracted in all concentration ranges. In addition, alkali metals such as Na, Cs, and K were extracted to less than 1% in all D2EHPA concentration ranges.

Extraction Rates when Performing Organic Solvent Extraction of Waste Sulfuric Acid Vanadium Water Leachate with Organic Solvent D2EHPA by O/a Ratio at Stirring Rate of 250 to 500 Rpm Tables 8 and 9 below showed results of solvent extraction experiments according to an organic phase/aqueous phase ratio (O/A ratio).

TABLE 8

| O/A ratio | V | Fe | Ca | Si | Al | Ti | Na | Cs | K | pH |
|---|---|---|---|---|---|---|---|---|---|---|
| 0.5 | 56.7 | 100 | 0.3 | 53.7 | 3.8 | 100 | 0.1 | 0.0 | 0.1 | 1.31 |
| 1 | 68.7 | 100 | 23.8 | 58.8 | 9.2 | 100 | 0.1 | 0.0 | 0.2 | 1.3 |
| 1.5 | 77.0 | 100 | 32.2 | 57.6 | 35.7 | 100 | 0.1 | 0.0 | 0.5 | 1.27 |
| 2 | 80.0 | 100 | 38.0 | 57.1 | 38.1 | 100 | 0.2 | 0.0 | 0.3 | 1.26 |
| 4 | 85.0 | 100 | 44.5 | 57.1 | 47.9 | 100 | 0.2 | 0.0 | 0.3 | 1.22 |

Table 8 above showed extraction rates when performing the organic solvent extraction of the waste sulfuric acid vanadium water leachate with D2EHPA of 0.7 M concentration at O/A=0.5, 1, 1.5, 2, and 4 and a stirring rate of 250 to 500 rpm.

As shown in Table 8, it was confirmed that the extraction rate of V increased to reach up to 85% as the O/A ratio increased.

Fe and Ti were fully extracted at all O/A ratios and were not analyzed in raffinate, and Ca, Si, and Al showed the maximum extraction rates of 44.5%, 57.1%, and 47.9%. It was confirmed that alkali metals Na, K, and Cs were not almost extracted.

TABLE 9

| O/A ratio | V | Fe | Ca | Si | Al | Ti | Na | Cs | K | pH |
|---|---|---|---|---|---|---|---|---|---|---|
| 0.5 | 61.6 | 100 | 0.0 | 63.3 | 0.8 | 100 | 0.1 | 0.3 | 0.5 | 1.33 |
| 1 | 72.6 | 100 | 41.2 | 63.8 | 4.2 | 100 | 0.1 | 0.4 | 0.6 | 1.29 |
| 1.5 | 80.3 | 100 | 41.9 | 63.3 | 20.5 | 100 | 0.2 | 0.3 | 0.6 | 1.28 |
| 2 | 84.6 | 100 | 48.1 | 63.3 | 32.1 | 100 | 0.1 | 0.3 | 0.7 | 1.26 |
| 4 | 88.1 | 100 | 53.1 | 64.4 | 42.7 | 100 | 0.2 | 0.4 | 0.7 | 1.21 |

Table 9 above showed extraction rates when performing the organic solvent extraction of the waste sulfuric acid vanadium water leachate with D2EHPA of 1 M concentration at O/A=0.5, 1, 1.5, 2, and 4 and a stirring rate of 250 to 500 rpm.

As shown in Table 9, when 1 mol/L D2EHPA was used, the extraction rates of valuable metals increased together as the O/A ratio increased. When the O/A ratio was 4, the extraction rate of V was 88.1%, showing the highest extraction rate. Ti and Fe were fully extracted at all O/A ratios and were not analyzed in raffinate, and in the case of Si, the extraction rate was maintained at about 63%. It was confirmed that Ca and Al were extracted 53.1% and 42.7% at O/A=4, respectively, and in the case of Na, K, and Cs, trace amounts were extracted to less than 1%.

As a result of performing solvent extraction experiments according to an O/A ratio for each concentration, it was confirmed that the extraction rates of valuable metals increased as the concentration of D2EHPA and the O/A ratio increased. Among them, it could be seen that Ti and Fe were extracted first, and V, Ca, and Al were extracted in that order. Alkali metals tended to be extracted after other polycations were first extracted.

In addition, the condition in which the extraction rate of V was highest was when the O/A ratio was applied to 4 using 1 mol/L D2EHPA, the extraction rate of V was about 88%, and the entire amount of V could not be extracted using 0.7 M D2EHPA.

Therefore, 0.7 M D2EHPA, which had the highest extraction rate of V, was determined as an optimal concentration under a condition in which Cs was not extracted.

<Example 3> Saponified Organic Solvent Extraction of Waste Sulfuric Acid Vanadium Water Leachate A saponified organic solvent was added to the waste sulfuric acid vanadium water leachate of Example 1 to extract vanadium with the saponified organic solvent.

A solvent extraction experiment was performed according to saponification of 0.7 M D2EHPA. Saponification of D2EHPA was performed using 5 mol/L NaOH, and solvent extraction experiments were performed under conditions of O/A=1 by applying the degree of saponification of 3%, 5%, and 7%.

The extraction rates were calculated based on a feed composition and shown in Table 10 below.

Here, the waste sulfuric acid vanadium water leachate used a solution obtained after a reaction time of 30 minutes at a reaction temperature of 25° C. as an optimum leaching condition.

Extraction Rates when Performing Organic Solvent Extraction of Waste Sulfuric Acid Vanadium Water Leachate with 0.7 M D2EHPA Organic Solvent Saponified to 3%, 5%, and 7% at O/A=1 and Stirring Rate of 250 to 500 Rpm

TABLE 10

| Degree of saponification | V | Fe | Ca | Si | Al | Ti | Na | Cs | K | pH |
|---|---|---|---|---|---|---|---|---|---|---|
| 3% | 75 | 100 | 27.1 | 69 | 32.8 | 100 | −29.7 | 1.2 | 0.3 | 1.38 |
| 5% | 76 | 100 | 32.5 | 70 | 34 | 100 | −28.6 | 1.6 | 0.5 | 1.46 |
| 7% | 76.8 | 100 | 36.5 | 72.4 | 39.2 | 100 | −25.4 | 2.0 | 1.6 | 1.51 |

Table 10 above showed extraction rates when performing organic solvent extraction of the waste sulfuric acid vanadium water leachate with 0.7 M D2EHPA organic solvent saponified to 3%, 5%, and 7% at O/A=1 and a stirring rate of 250 to 500 rpm.

Referring to Table 10, it could be seen that the equilibrium pH increased as the degree of saponification increased, and as compared to unsaponified 0.7 M D2EHPA shown in Table 8, it could be confirmed that the extraction rates of all valuable metals except Na were increased.

Similarly, V showed an extraction rate of about 75 to 76% in the applied range of the degree of saponification. Accordingly, a countercurrent multi-stage simulation experiment was performed by applying a degree of saponification of 0.7 M D2EHPA to 3%.

A countercurrent 3-stage simulation experiment was performed using 3% saponified 0.7 M D2EHPA, and the results were shown in Table 11.

Extraction Rates when Performing Organic Solvent Extraction of Waste Sulfuric Acid Vanadium Water Leachate with 0.7 M D2EHPA Organic Solvent Saponified to 3% in Countercurrent 3-Stage Simulation Experiment at O/A=1.5 and Stirring Rate of 250 to 500 Rpm

TABLE 11

| O/A ratio | V | Fe | Ca | Si | Al | Ti | Na | Cs | K | pH |
|---|---|---|---|---|---|---|---|---|---|---|
| R9 | 93.1 | 100 | 58.2 | 39.7 | 80.3 | 100 | −50 | 0.0 | 9.8 | 1.37 |
| R11 | 86.7 | 100 | 15.4 | 46.3 | 54.3 | 100 | 1.3 | 0.4 | 10.5 | 1.29 |
| R12 | 70.6 | 100 | 0.4 | 47.9 | 23.8 | 100 | 0.6 | 0.4 | 10.7 | 1.33 |

* R9: extraction 3-stage raffinate. R11: extraction 2-stage raffinate, R12: extraction 1-stage raffinate Table 11 above showed extraction rates when performing organic solvent extraction of the waste sulfuric acid vanadium water leachate with a 0.7 M D2EHPA organic solvent saponified to 3% in a countercurrent 3-stage simulation experiment at O/A=1.5 and a stirring rate of 250 to 500 rpm.

Referring to Table 11 above, when countercurrent 3-stage extraction was performed under the condition of an O/A ratio of 1.5 using 0.7 mol/L D2EHPA saponified to 3%, the extraction rate of V was about 93.1%, Ca 58.2%, Si 39.7%, Al 80.3% and K 9.8% were extracted, and Fe and Ti were fully extracted.

Extraction Rates when Performing Organic Solvent Extraction of Waste Sulfuric Acid Vanadium Water Leachate with 0.7 M D2EHPA Organic Solvent Saponified to 5% in Countercurrent 3-Stage Simulation Experiment at O/A=1.5 and Stirring Rate of 250 to 500 Rpm A countercurrent 3-stage simulation experiment was performed using 5% saponified 0.7 M D2EHPA, and the results were shown in Table 12.

TABLE 12

| O/A ratio | V | Fe | Ca | Si | Al | Ti | Na | Cs | K | pH |
|---|---|---|---|---|---|---|---|---|---|---|
| R9 | 94.2 | 100 | 63.6 | 25.3 | 89.4 | 100 | −98.8 | 1.2 | 12.2 | 1.44 |
| R11 | 87.2 | 100 | 12.1 | 61.1 | 63.0 | 100 | 2.8 | 2.4 | 12.5 | 1.27 |
| R12 | 76.6 | 100 | 8.1 | 72.6 | 41.1 | 100 | 2.4 | 2.8 | 12.5 | 1.31 |

* R9: extraction 3-stage raffinate. R11: extraction 2-stage raffinate, R12: extraction 1-stage raffinate Table 12 above showed extraction rates when performing organic solvent extraction of the waste sulfuric acid vanadium water leachate with a 0.7 M D2EHPA organic solvent saponified to 5% in a countercurrent 3-stage simulation experiment at O/A=1.5 and a stirring rate of 250 to 500 rpm.

Referring to Table 12, when the degree of saponification was increased to 5%, the pH of the final raffinate in the extraction 3-stage slightly increased, and the extraction rate of V also slightly increased to 94.2%.

Extraction Rates when Performing Organic Solvent Extraction of Waste Sulfuric Acid Vanadium Water Leachate with 0.7 M D2EHPA Organic Solvent Saponified to 7% in Countercurrent 3-Stage Simulation Experiment at O/A=1.5 and Stirring Rate of 250 to 500 Rpm A countercurrent 3-stage simulation experiment was performed using 7% saponified 0.7 M D2EHPA, and the results were shown in Table 13.

TABLE 13

| O/A ratio | V | Fe | Ca | Si | Al | Ti | Na | Cs | K | pH |
|---|---|---|---|---|---|---|---|---|---|---|
| R9 | 94.6 | 100 | 71.9 | 34.7 | 86.9 | 100 | −144.0 | 1.2 | 12.2 | 1.57 |
| R11 | 86.7 | 100 | 4.0 | 60.0 | 57.4 | 100 | 2.0 | 3.6 | 12.2 | 1.36 |
| R12 | 74.7 | 100 | 2.1 | 73.7 | 36.2 | 100 | 2.8 | 4.4 | 12.5 | 1.4 |

* R9: extraction 3-stage raffinate. R11: extraction 2-stage raffinate, R12: extraction 1-stage raffinate Table 13 above showed extraction rates when performing organic solvent extraction of the waste sulfuric acid vanadium water leachate with a 0.7 M D2EHPA organic solvent saponified to 7% in a countercurrent 3-stage simulation experiment at O/A=1.5 and a stirring rate of 250 to 500 rpm.

Referring to Table 13, when countercurrent 3-stage extraction was performed using 0.7 M D2EHPA saponified to 7%, the extraction rate of V in the extraction 3-stage was 94.6%, and Ca 71.9%, Si 34.7%, Al 86.9%, Cs 1.2%, and K 12.2% were extracted. At this time, Fe and Ti were fully extracted.

Therefore, in order to increase the extraction rate of V, a countercurrent 3-stage extraction experiment was performed by saponifying 0.7 M D2EHPA to 10% and 15%.

Extraction Rates when Performing Organic Solvent Extraction of Waste Sulfuric Acid Vanadium Water Leachate with 0.7 M D2EHPA Organic Solvent Saponified to 10% in Countercurrent 3-Stage Simulation Experiment at O/A=1.5 and Stirring Rate of 250 to 500 Rpm A countercurrent 3-stage simulation experiment was performed using 10% saponified 0.7 M D2EHPA, and the results were shown in Table 14.

TABLE 14

| O/A ratio | V | Fe | Ca | Si | Al | Ti | Na | Cs | K | pH |
|---|---|---|---|---|---|---|---|---|---|---|
| R9 | 96.6 | 100 | 87.4 | 16.1 | 92.0 | 100 | −212.5 | 0.2 | 0.2 | 1.73 |
| R11 | 88.9 | 100 | 11.6 | 7.3 | 59.7 | 100 | −185.0 | 7.1 | 0.9 | 1.36 |
| R12 | 77.0 | 100 | 4.6 | 2.4 | 33.4 | 100 | −51.3 | 6.9 | 1.1 | 1.35 |

* R9: extraction 3-stage raffinate. R11: extraction 2-stage raffinate, R12: extraction 1-stage raffinate Table 14 above showed extraction rates when performing organic solvent extraction of the waste sulfuric acid vanadium water leachate with a 0.7 M D2EHPA organic solvent saponified to 10% in a countercurrent 3-stage simulation experiment at O/A=1.5 and a stirring rate of 250 to 500 rpm.

When a countercurrent 3-stage simulation extraction experiment was performed using the 10% saponified 0.7 mol/L D2EHPA, 118.7 mg/L V, 41.6 mg/L Ca, 10.4 mg/L Si, 15.3 mg/L Al, 6600 mg/L Na, 2595 mg/L Cs, and 6480 mg/L K were contained in raffinate generated in the countercurrent 3-stage, and the pH was 1.73. At this time, it was confirmed that the extraction rate of V calculated based on a feed composition was about 96.6%.

Extraction Rates when Performing Organic Solvent Extraction of Waste Sulfuric Acid Vanadium Water Leachate with 0.7 M D2EHPA Organic Solvent Saponified to 15% in Countercurrent 3-Stage Simulation Experiment at O/A=1.5 and Stirring Rate of 250 to 500 Rpm A countercurrent 3-stage simulation experiment was performed using 15% saponified 0.7 M D2EHPA, and the results were shown in Table 15.

TABLE 15

| O/A ratio | V | Fe | Ca | Si | Al | Ti | Na | Cs | K | pH |
|---|---|---|---|---|---|---|---|---|---|---|
| R9 | 99.5 | 100 | 100 | 1.6 | 100 | 100 | −226 | 0.0 | 0.1 | 2.32 |
| R11 | 93.0 | 100 | 72.7 | 1.6 | 79.0 | 100 | −200 | 0.0 | 0.1 | 1.79 |
| R12 | 74.3 | 100 | 0.4 | 1.6 | 30.7 | 100 | −75 | 0.0 | 0.1 | 1.43 |

* R9: extraction 3-stage raffinate. R11: extraction 2-stage raffinate, R12: extraction 1-stage raffinate Table 15 above showed extraction rates when performing organic solvent extraction of the waste sulfuric acid vanadium water leachate with a 0.7 M D2EHPA organic solvent saponified to 15% in a countercurrent 3-stage simulation experiment at O/A=1.5 and a stirring rate of 250 to 500 rpm.

When a countercurrent 3-stage simulation extraction experiment was performed using the 15% saponified 0.7M D2EHPA, it was confirmed that the extraction rate of V reached 99% or more when the final raffinate pH was 2 or more. At this time, not only V, but also Fe, Ca, Al, and Ti were fully extracted. Besides, Si 1.6% and K 0.1% were extracted, and Cs was not extracted at all.

<Example 4> Selective Recovery of Vanadium from Vanadium Organic Extract

An alkali aqueous solution was added to the vanadium organic extract of Example 2 to selectively recover vanadium.

Here, Table 16 below showed a composition in an organic phase when performing organic solvent extraction of the waste sulfuric acid vanadium water leachate with a 0.7 M D2EHPA organic solvent saponified to 15% in a countercurrent 3-stage simulation experiment at O/A=1.5 and a stirring rate of 250 to 500 rpm.

TABLE 16

|  | V | Fe | Ca | Si | Al |
|---|---|---|---|---|---|
| loaded organic | 2330 | 87 | 220 | 0.1 | 127 |

Referring to Table 16, in an organic phase obtained after performing countercurrent 3-stage extraction at O/A=1.5 using a 15% saponified 0.7 M D2EHPA organic solvent, V 2330 mg/L, Fe 87 mg/L, Ca 220 mg/L, Si 0.1 mg/L, and Al 127 mg/L were contained.

Stripping Rates of Metal Ions when Selectively Recovering Vanadium from Vanadium Organic Extract in 0.1, 0.3, 0.5, 0.7, and 1 M of $(NH_4)_2CO_3$ Alkali Aqueous Solution at O/A=1

An experiment for selectively stripping V from the vanadium organic extract of Example 2 was performed using a $(NH_4)_2CO_3$ alkali aqueous solution.

A $(NH_4)_2CO_3$ concentration range was applied to 0.1, 0.3, 0.5, 0.7, and 1 mol/L, and the experiment was performed under the condition of O/A=1.

It was confirmed that at 0.1, 0.3, and 0.5 mol/L $(NH_4)_2CO_3$, three phases were formed and phase separation was not performed smoothly, and the phase separation occurred again from a higher concentration of 0.7 mol/L $(NH_4)_2CO_3$.

The results analyzed by taking a recoverable aqueous solution were shown in Table 17 below.

TABLE 17

| Concentration of $(NH_4)_2CO_3$ aqueous solution, mol/L | V | Fe | Ca | Si | Al | pH |
|---|---|---|---|---|---|---|
| 0.1 | 12.9 | — | — | — | — | 4.69 |
| 0.3 |  | Formed three phases |  |  |  | 5.44 |
| 0.5 |  | Formed three phases |  |  |  | 6.88 |
| 0.7 | 91.3 | — | — | — | — | 8.57 |
| 1 | 99.9 | — | — | — | — | 8.77 |

Table 17 above showed stripping rates of metal ions when selectively recovering vanadium from the vanadium organic extract of Example 2 in 0.1, 0.3, 0.5, 0.7, and 1 M of a $(NH_4)_2CO_3$ alkali aqueous solution at O/A=1, respectively.

When stripping using 0.1 mol/L $(NH_4)_2CO_3$, V was stripped at 12.9%, and when 0.7 mol/L $(NH_4)_2CO_3$ was used, 91.3% of V was stripped, and when 1 mol/L $(NH_4)_2CO_3$ was used, 99.9 % of V was stripped. At this time, other impurities Fe, Ca, Si and Al were not analyzed. That is, V may be selectively stripped using $(NH_4)_2CO_3$.

Stripping Rates of Metal Ions when Selectively Recovering Vanadium from Vanadium Organic Extract in 1 M of $(NH_4)_2CO_3$ Alkali Aqueous Solution at O/A=1, 1.5, 2, and 3

TABLE 18

| O/A ratio | V | Fe | Ca | Si | Al | pH |
|---|---|---|---|---|---|---|
| 1 | 99.9 | — | — | — | — | 8.57 |
| 1.5 | 82 | — | — | — | — | 8.14 |
| 2 | 73.3 | — | — | — | — | 6.4 |
| 3 |  | Formed three phases |  |  |  |  |

Table 18 above showed stripping rates of metal ions when selectively recovering vanadium from the vanadium organic extract of Example 2 in 01 M of a $(NH_4)_2CO_3$ alkali aqueous solution at O/A=1, 1.5, 2, and 3, respectively.

As the O/A ratio increased, the stripping efficiency of V decreased. When the O/A ratios were 1, 1.5, and 2, the stripping efficiencies of V were 99.9%, 82%, and 73.3%, respectively, and when the O/A ratio was 3, three phases were formed. Accordingly, conditions of 1 M $(NH_4)_2CO_3$ and O/A=1 were selected as conditions for selectively stripping V from the vanadium organic extract (loaded organic).

FIGS. 3A to 3E are mass balance data of valuable metals in an organic solvent extraction process according to an embodiment of the present disclosure.

Referring to FIGS. 3A to 3E, it was confirmed that when in 15% saponified 0.7 M D2EHPA at O/A=1.5, 1 M of a $(NH_4)_2CO_3$ alkali aqueous solution was added at O/A=1 to strip metal ions, in the amounts of extraction of metal ions, vanadium was 2,333 mg/L, and iron, calcium, aluminum, silicon, titanium, sodium, cesium, and potassium were all 0 mg/L, and as a result, vanadium and other valuable metals were separately recovered.

<Example 5> Precipitation of $CsAl(SO_4)_2$ from Raffinate Containing Cs

A composition of the remaining raffinate was shown in Table 19 below after extracting 99% or more of vanadium through solvent extraction from a water leachate of a waste sulfuric acid vanadium catalyst using the 15% saponified 0.7 M D2EHPA of Example 3.

TABLE 19

|  | V | Fe | Ca | Si | Al | Ti | Na | Cs | K | pH |
|---|---|---|---|---|---|---|---|---|---|---|
| Final raffinate | 18.3 | 0 | 0 | 12.2 | 0 | 0 | 5300 | 2600 | 6480 | 2.32 |
| Extraction rate, % | 99.5 | 100 | 100 | 1.6 | 100 | 100 | −228.1 | 0.0 | 0.2 | — |

Table 19 above showed a composition of the remaining raffinate after extracting 99% or more of vanadium through solvent extraction from a water leachate of a waste sulfuric acid vanadium catalyst using the 15% saponified 0.7 M D2EHPA of Example 3.

18.3 mg/L V, 12.2 mg/L Si, 5250 mg/L Na, 2600 mg/L Cs, and 6480 mg/L K were contained in the raffinate generated after the countercurrent 3-stage extraction. At this time, the extraction rate of V was about 99.5%. An experiment for precipitating Cs in the form of cesium alum, $CsAl(SO_4)_2$, from the obtained raffinate was performed as follows.

Cesium alum had very low solubility in water at a low temperature. Accordingly, Cs, a radioactive material, may be precipitated from raffinate containing Cs.

Reaction Formula of $Cs^+$ and $Al_2(SO_4)_3$ contained in a raffinate aqueous solution was shown below.

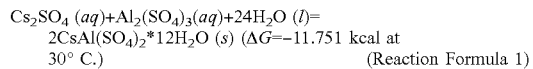

$Cs_2SO_4$ (aq)+$Al_2(SO_4)_3$(aq)+24$H_2O$ (l)= 2$CsAl(SO_4)_2$*12$H_2O$ (s) ($\Delta G$=−11.751 kcal at 30° C.)  (Reaction Formula 1)

Precipitation Efficiency of Metal Ions Through Addition of $Al_2(SO_4)_3$*13-14$H_2O$ at Cooling Temperature of 8° C.

As a cesium alum precipitation reaction, first, 100 mL of the raffinate aqueous solution containing Cs was added into a water jacket reactor, and 1 g of a $Al_2(SO_4)_3$*13-14$H_2O$ reagent was added in 100 mL of the raffinate aqueous solution to further promote the $CsAl(SO_4)_2$ precipitation reaction.

In addition, for an active reaction between $Cs^+$ and $Al_2(SO_4)_3$, the mixture was stirred at 200 rpm using a magnetic bar at 80° C. for 1 hour. After reacting for 1 hour under a condition of 80° C., the aqueous solution was cooled to 8° C. using a thermostatic cooling device to precipitate cesium alum, $CsAl(SO_4)_2$. Here, the mixture was stirred using a magnetic bar, and the reaction was carried out for 5 hours at a stirring rate of 80 rpm, and the results were shown in Table 20 below.

TABLE 20

| $Al_2(SO_4)_3$*13-14$H_2O$ addition amount | Na | Cs | K |
|---|---|---|---|
| 1 g/100 mL | 0 | 64 | 0 |
| 2 g/100 mL | 0 | 94.2 | 0.1 |

Table 20 above showed precipitation efficiencies of metal ions through addition of $Al_2(SO_4)_3$*13-14$H_2O$ at a cooling temperature of 8° C.

Referring to Table 20, Cs was selectively precipitated and the efficiency thereof was about 64%. Here, in order to further improve the precipitation efficiency of Cs, the addition amount of $Al_2(SO_4)_3$*13-14$H_2O$ was increased up to 5 g, and the cooling temperature was further lowered to 5° C. to further reduce the solubility of cesium alum to perform the precipitation experiment.

Precipitation Efficiency of Metal Ions Through Addition Amount of $Al_2(SO_4)_3$*13-14$H_2O$ at Cooling Temperature of 5° C.

TABLE 21

| $Al_2(SO_4)_3$*13-14$H_2O$ addition amount | Na | Cs | K |
|---|---|---|---|
| 1 g/100 mL | 0 | 63 | 0 |
| 2 g/100 mL | 0.1 | 96.3 | 0.1 |
| 3 g/100 mL | 0.3 | 98.5 | 0.2 |
| 5 g/100 mL | 0.3 | 98.7 | 0.4 |

Table 21 above showed precipitation efficiencies of metal ions according to an addition amount of $Al_2(SO_4)_3$*13-14$H_2O$ at a cooling temperature of 5° C.

Referring to Table 21, when the addition amounts of $Al_2(SO_4)_3$*13-14$H_2O$ were 1, 2, 3 and 5 g/100 mL when the cooling temperature was 5° C., the precipitation efficiencies of Cs were 63%, 96.3%, 98.5% and 98.7%, respectively. It was confirmed that even if the addition amount of $Al_2(SO_4)_3$*13-14$H_2O$ was increased, the precipitation efficiency did not increase any more due to the solubility of cesium alum itself.

FIG. 4 is an XRD crystal structure analysis graph of cesium alum according to Example 5.

In FIG. 4, an XRD analysis result of a precipitate generated when adding 2 g of $Al_2(SO_4)_3$*13-14$H_2O$ was shown.

Referring to FIG. 4, it was confirmed that the precipitate formed by adding $Al_2(SO_4)_3$ to the raffinate aqueous solution containing Cs was cesium alum, $CsAl(SO_4)_2$*12$H_2O$.

0.5 g of the corresponding precipitate was dissolved in aqua regia, and then diluted in a 50 mL volumetric flask, and the results of analyzing impurities to determine the purity were shown in Table 22 below.

TABLE 22

| $CsAl(SO_4)_2$*12$H_2O$ | Na | K | V | Ca | Fe | Ti | Si |
|---|---|---|---|---|---|---|---|
| Aqua regia solution composition, mg/L | 34.5 | 41.9 | 12 | — | — | — | — |
| wt. % | 0.34 | 0.42 | 0.12 | — | — | — | — |

Table 22 above showed the results of analyzing impurities after dissolving 0.5 g of a precipitate in aqua regia.

Referring to Table 22, cesium alum, $CsAl(SO_4)_2$*12$H_2O$ was dissolved in aqua regia, and then 34.5 mg/L Na, 41.9 mg/L K, and 12 mg/L V were contained in the aqueous solution.

When the composition of impurities other than Cs and Al, which formed the crystal structure of cesium alum, was converted into wt % and summed, the sum thereof was 0.884%, and the purity of cesium alum $CsAl(SO_4)_2$*12$H_2O$ was about 99.1%.

Since cesium alum $CsAl(SO_4)_2$ recovered from the waste sulfuric acid vanadium catalyst may be directly utilized, or may be converted into the form of $Cs_2SO_4$ through a smelting process including water leaching and then prepared into various compounds according to a purpose, the cesium alum $CsAl(SO_4)_2$ can be applied to various fields of industry.

So far, the selective recovery method of vanadium and cesium from the waste sulfuric acid vanadium catalyst according to the present disclosure and the high-quality vanadium aqueous solution and the cesium alum produced by the method have been described with respect to specific embodiments, but it will be apparent that various modifications can be made without departing from the scope of the present disclosure.

Therefore, the scope of the present disclosure should not be limited to the exemplary embodiments and should be defined by the appended claims and equivalents to the appended claims.

In other words, the embodiments described above are illustrative in all aspects and should be understood as not being restrictive, and the scope of the present disclosure is represented by appended claims to be described below rather than the detailed description, and it is to be interpreted that the meaning and scope of the appended claims and all changed or modified forms derived from the equivalents thereof are included within the scope of the present disclosure.

What is claimed is:

1. A selective recovery method of vanadium and cesium from a waste sulfuric acid vanadium catalyst containing vanadium, cesium, iron, silica, aluminum, potassium, sodium, calcium and titanium by a hydrometallurgical method including water leaching, solid-liquid separation, vanadium solvent extraction, vanadium selective stripping and cesium alum production, the selective recovery method comprising the steps of:
   (a-1) crushing and pulverizing a waste sulfuric acid vanadium catalyst;
   (a-2) water-leaching the crushed and pulverized waste sulfuric acid vanadium catalyst and then solid-liquid separating to prepare a waste sulfuric acid vanadium water leachate containing vanadium and cesium in a cationic state;
   (a-3) adding an organic solvent as a cation exchange extractant to the waste sulfuric acid vanadium water leachate containing vanadium and cesium in the cationic state to obtain a vanadium organic extract from which vanadium is solvent-extracted and a raffinate aqueous solution remaining after the solvent extraction of vanadium;
   (a-4) preparing a vanadium aqueous solution by adding an alkali aqueous solution to the vanadium organic extract to selectively strip vanadium; and
   (a-5) selectively recovering cesium from cesium alum precipitated by adding and reacting an aluminum compound to the raffinate aqueous solution obtained after the vanadium solvent extraction and cooling a mixture.

2. The selective recovery method of claim 1, wherein in (a-1) the crushing and pulverizing of the waste sulfuric acid vanadium catalyst,
   the waste sulfuric acid vanadium catalyst is crushed and pulverized by at least one device selected from the group consisting of jaw crusher, gyratory crusher, roller crusher, cone crusher, hammermil crusher, tumbling mill, vibration mill, attrition mill, ball mill, rod mill, pebble mill, and autogeneous mill to prepare the crushed and pulverized waste sulfuric acid vanadium catalyst, and
   a particle size of the crushed and pulverized waste sulfuric acid vanadium catalyst is 10 to 500 mesh.

3. The selective recovery method of claim 1, wherein in (a-2) the water-leaching of the crushed and pulverized waste sulfuric acid vanadium catalyst and then solid-liquid separating to prepare the waste sulfuric acid vanadium water leachate and a leaching residue,
   the water-leaching condition is 10 minutes to 12 hours under conditions of a reaction temperature of 25 to 80° C., a solid-liquid ratio of 1/10, and a stirring rate of 50 to 500 rpm by adding the crushed and pulverized waste sulfuric acid vanadium catalyst to water.

4. The selective recovery method of claim 3, wherein the vanadium leaching rate of the waste sulfuric acid vanadium water leachate is 10 to 99.9 wt %.

5. The selective recovery method of claim 1, wherein in (a-3) the adding of the organic solvent as the cation exchange extractant to the waste sulfuric acid vanadium water leachate containing vanadium and cesium in the cationic state to obtain the vanadium organic extract from which vanadium is solvent-extracted and the raffinate aqueous solution remaining after the solvent extraction of vanadium,
   the organic solvent is at least one selected from the group consisting of 2-ethyl hexyl phosphonic acid, di-2-ethylhexyl phosphoric acid, mono-2-ethyl hexyl ester, bis-(2,4,4-trimethylpentyl) phosphinic acid, alkyl monocarboxylic acid, tributyl phosphate, and trialkylphosphine oxide.

6. The selective recovery method of claim 1, wherein in (a-3) the adding of the organic solvent as the cation exchange extractant to the waste sulfuric acid vanadium water leachate containing vanadium and cesium in the cationic state to obtain the vanadium organic extract from which vanadium is solvent-extracted and the raffinate aqueous solution remaining after the solvent extraction of vanadium,
   the organic solvent is an organic solvent having a degree of saponification of 1 to 15%, and
   the organic solvent is at least one selected from the group consisting of 2-ethyl hexyl phosphonic acid, di-2-ethylhexyl phosphoric acid, mono-2-ethyl hexyl ester, bis-(2,4,4-trimethylpentyl) phosphinic acid, alkyl monocarboxylic acid, tributyl phosphate, and trialkylphosphine oxide.

7. The selective recovery method of claim 5, wherein in (a-3) the adding of the organic solvent as the cation exchange extractant to the waste sulfuric acid vanadium water leachate containing vanadium and cesium in the cationic state to obtain the vanadium organic extract from which vanadium is solvent-extracted and the raffinate aqueous solution remaining after the solvent extraction of vanadium,
   an experimental condition for extracting vanadium with the organic solvent is 2 minutes to 30 minutes under the conditions of a reaction temperature of 15 to 40° C., O (organic phase)/A (water phase)=1 to 4, and a stirring rate of 50 to 500 rpm by adding the organic solvent to the waste sulfuric acid vanadium water leachate.

8. The selective recovery method of claim 5, wherein the vanadium extraction rate of the vanadium organic extract extracted using the organic solvent is 25 to 95 wt % at pH 1 to 6.

9. The selective recovery method of claim 6, wherein in (a-3) the adding of the organic solvent as the cation exchange extractant to the waste sulfuric acid vanadium water leachate containing vanadium and cesium in the cationic state to obtain the vanadium organic extract from which vanadium is solvent-extracted and the raffinate aqueous solution remaining after the solvent extraction of vanadium,
   an experimental condition for extracting vanadium with the organic solvent is 2 minutes to 30 minutes under the conditions of a reaction temperature of 15 to 40° C., O (organic phase)/A (water phase)=1 to 4, and a stirring rate of 50 to 500 rpm by adding the organic solvent having the degree of saponification of 1 to 15% to the waste sulfuric acid vanadium water leachate.

10. The selective recovery method of claim 6, wherein the vanadium extraction rate of the vanadium organic extract extracted using the organic solvent having the degree of saponification of 1 to 15 wt % is 65 to 99.5 wt %.

11. The selective recovery method of claim 1, wherein in (a-3) the adding of the organic solvent as the cation exchange extractant to the waste sulfuric acid vanadium water leachate containing vanadium and cesium in the cationic state to obtain the vanadium organic extract from which vanadium is solvent-extracted and the raffinate aqueous solution remaining after the solvent extraction of vanadium, the raffinate aqueous solution contains Na, Cs, or K.

12. The selective recovery method of claim 1, wherein in (a-4) the preparing of the vanadium aqueous solution by adding the alkali aqueous solution to the vanadium organic extract to selectively strip vanadium, the alkali aqueous solution is at least one alkali aqueous solution selected from the group consisting of $(NH_4)_2CO_3$, NaOH, and $Na_2CO_3$ in a concentration range of 0.05 to 5 M.

13. The selective recovery method of claim 12, wherein the vanadium stripping rate of the vanadium aqueous solution is 70 to 99.99 wt %.

14. The selective recovery method of claim 1, wherein in (a-5) the selectively recovering of the cesium from the cesium alum by adding the aluminum compound from the raffinate aqueous solution obtained after the solvent extraction of vanadium, the aluminum compound is at least one selected from the group consisting of aluminum chloride, sodium aluminate, aluminum powder, aluminum hydroxide, aluminum sulfate, and alumina.

15. The selective recovery method of claim 14, wherein when the cesium alum is formed in the (a-5) raffinate aqueous solution, the cesium precipitation rate is 60 to 98 wt %.

16. The selective recovery method of claim 15, wherein the purity of the cesium alum is 90 to 99.1 wt %.

* * * * *